US007210826B2

(12) United States Patent
Haugaard et al.

(10) Patent No.: US 7,210,826 B2
(45) Date of Patent: May 1, 2007

(54) COMPONENT TRAY FOR ELECTRICAL FIXTURE HOUSING

(75) Inventors: Eric J. Haugaard, Kenosha, WI (US); Kurt S. Wilcox, Libertyville, IL (US)

(73) Assignee: Ruud Lighting, Inc., Racine, WI (US)

( * ) Notice: Subject to any disclaimer, the term of this patent is extended or adjusted under 35 U.S.C. 154(b) by 0 days.

(21) Appl. No.: 11/093,469

(22) Filed: Mar. 30, 2005

(65) Prior Publication Data

US 2006/0227536 A1 Oct. 12, 2006

(51) Int. Cl.
*B60Q 1/06* (2006.01)
*F21V 20/00* (2006.01)

(52) U.S. Cl. ...................... 362/373; 362/220; 362/294; 362/374

(58) Field of Classification Search ................ 362/294, 362/373, 374, 375, 221, 264, 147, 148, 220
See application file for complete search history.

(56) References Cited

U.S. PATENT DOCUMENTS

| | | | | |
|---|---|---|---|---|
| 3,673,402 A * | 6/1972 | Weiss | 362/220 |
| 4,156,902 A | 5/1979 | Wandler | 362/221 |
| 4,220,986 A | 9/1980 | Matteo et al. | 362/659 |
| 4,507,719 A | 3/1985 | Quiogue | 362/404 |
| 4,791,539 A | 12/1988 | Ewing | 362/362 |
| 5,025,356 A | 6/1991 | Gawad | 362/307 |
| 5,136,493 A | 8/1992 | Straus et al. | 361/674 |
| 5,440,466 A * | 8/1995 | Belisle et al. | 362/222 |
| 5,803,590 A | 9/1998 | Wedell et al. | 362/294 |
| 6,059,424 A * | 5/2000 | Kotloff | 362/374 |
| 6,174,074 B1 | 1/2001 | Lahijani | 362/264 |
| 6,276,818 B1 * | 8/2001 | Wang | 362/374 |
| 6,578,988 B2 | 6/2003 | Johnson et al. | 362/649 |
| 6,867,959 B2 | 3/2005 | Haugaard et al. | 362/373 |

OTHER PUBLICATIONS

International Search Report and Written Opinion of the International Searching Authority for Co-Pending PCT Application Serial No. PCT/US06/011062, Dated Jun. 20, 2006 (6 pages).

* cited by examiner

*Primary Examiner*—John Anthony Ward
(74) *Attorney, Agent, or Firm*—Jansson Shupe & Munger, Ltd.

(57) ABSTRACT

An assembly for an electrical fixture housing, the housing of the type enclosing ballasts, the housing including top and rear walls, first and second side walls, and two heat sink pads orthogonally disposed respecting one another, the assembly including a component tray having a longitudinal axis between first and second ends, a middle portion, and a ballast secured to the middle portion, and first and second tray attachments structured for quickly-detachable attachment of the respective first and second ends of the component tray to the respective first and second side walls of the housing, where the attachment effects direct and snug engagement of the ballast with the two heat sink pads.

25 Claims, 10 Drawing Sheets

FIG. 2
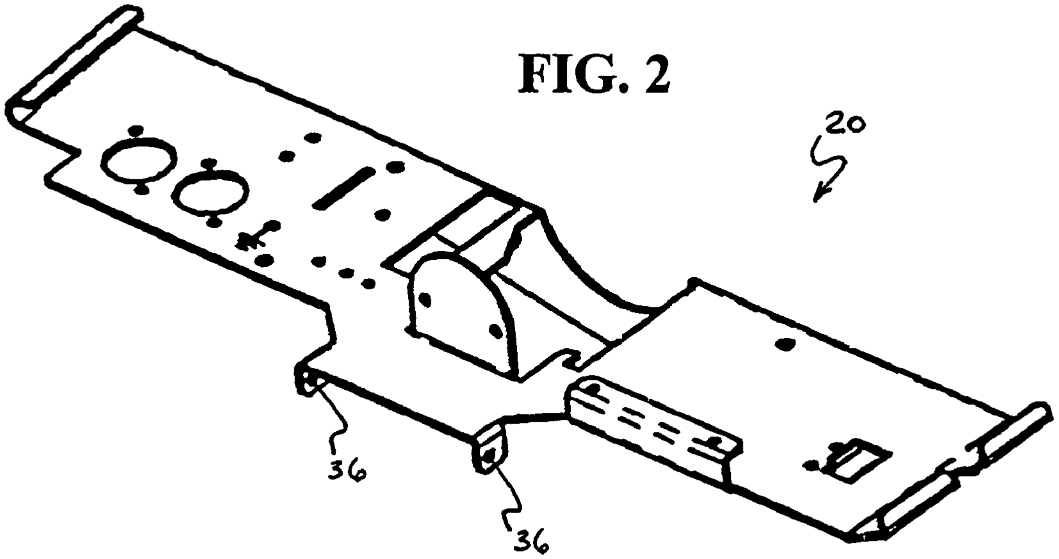
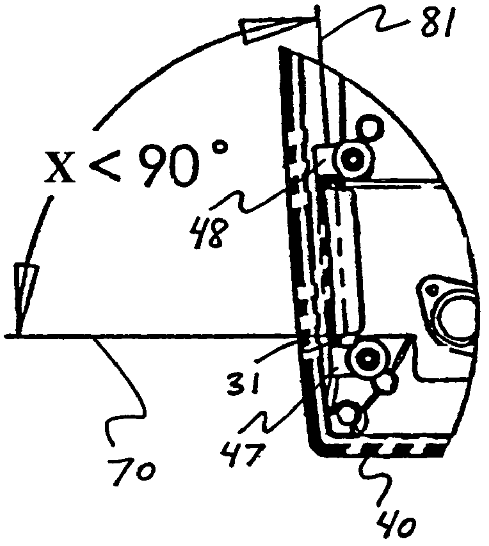
FIG. 4
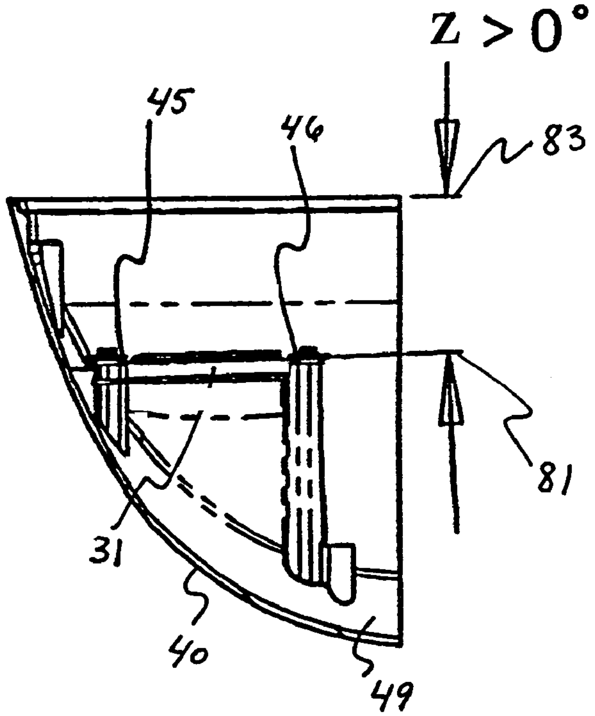
FIG. 5

COMPONENT TRAY FOR ELECTRICAL FIXTURE HOUSING

FIELD OF THE INVENTION

The invention relates generally to housings for electrical fixtures and, more particularly, to a system for securing a ballast in such a housing.

BACKGROUND OF THE INVENTION

Many lighting systems use lamps which are powered by electrical and/or electronic circuits that include transformers for changing a line voltage to meet the needs of a particular type of lamp(s) being powered. Such transformers may be identified simply as being "ballasts," although that term may also refer to the entire circuit being used to power the lamp(s). In a lighting fixture, a ballast can also assist in regulating power. For example, when such a ballast is used in conjunction with a capacitor, a power factor of the circuit is controlled. When a ballast transformer is used, for example, in an HID lighting application, the transformer may act as an inductor for limiting power. Conventional ballasts often use an open core and coil construction, in which a core of laminated steel, iron, or similar material has wire windings.

Lighting fixtures create heat as a result of its lamp(s) converting electrical energy into light. The heat inside such a lighting fixture is made greater when a ballast is also included inside the lighting fixture housing because the ballast also consumes energy and generates heat. Heat can be very damaging to lighting components, causing compromised performance or failure. It is therefore important to reduce the amount of such heat inside the lighting fixture in order to extend the life of the various lighting fixture components, for safety, and for other reasons. For example, a failing ballast can get extremely hot and become a fire hazard. While some ballasts include a safety device which shuts the ballast off in case of extreme thermal conditions, such safety devices are not infallible and, in any event, such problems may be reduced by simply reducing the heat within the fixture.

It is known to transfer heat from the ballast to the lighting fixture housing for dissipating such heat. For example, a double-wall ballast engagement and ballast mounting method is disclosed in U.S. Pat. No. 6,867,959, incorporated herein in its entirety and having the same assignee and inventors as the present invention. The '959 patent discloses a housing where screws are used for directly attaching the ballast to two walls of the fixture. However, such a structure is not adapted for easily servicing the lighting fixture, such as when it becomes necessary to replace any of the various components of the ballast circuit. There is a need for a lighting fixture that provides for transferring heat from the ballast while also providing for ease of ballast circuit servicing.

OBJECTS OF THE INVENTION

It is an object of the invention to provide an improved electrical fixture housing overcoming some of the problems and shortcomings of the prior art, including those referred to above.

Another object of the invention is to provide an electrical fixture housing having a component tray adapted for easy servicing of an enclosed ballast circuit.

Another object of the invention is to provide a component tray for electrical fixtures where a ballast mounted on the component tray is positioned for efficient heat transfer between at least one side of the ballast and at least one wall of the fixture housing.

Still another object of the invention is to provide a component tray for electrical fixtures that provides snug engagement of a ballast and two walls of an electrical fixture housing by use of an urging mechanism for positioning the component tray in the housing.

Yet another object of the invention is to provide a component tray for electrical fixtures that is configured for either of a closed position forcing a ballast snugly against at least one wall of a housing and an open position semi-detaching the tray from the housing for servicing the component tray.

Another object of the invention is to provide a configuration for a component tray of an electrical fixture whereby the component tray swings into or out of a position of snug engagement of a ballast with at least one wall of a housing of the electrical fixture along an arc-shaped path.

Another object of the invention is to provide apparatus for first positioning a ballast tray in a location where adjacent walls of a ballast become close to corresponding walls of a heat sink, and then snugly fastening the ballast against the heat sink so that maximum heat transfer takes place between the two ballast walls and the heat sink.

Another object of the invention is to provide a method of snugly seating a ballast against heat sink wall(s) of an electrical fixture, where a self-adjusting attachment structure allows the ballast to be fastened into flush abutment with the heat sink wall(s) or unfastened to be easily moved to a servicing position.

Another object of the invention is to provide a component tray for lighting fixtures that is adapted for easy servicing and for snugging a ballast of the component tray against a heat sink surface of a housing of the lighting fixture, with a self-adjusting of the snugging mechanism.

How these and other objects are accomplished will become apparent from the following descriptions and drawing figures.

SUMMARY OF THE INVENTION

According to an aspect of the invention, in a housing for electrical lighting fixtures, the housing of the type enclosing ballasts, the housing including top and rear walls and first and second side walls, an improvement includes a ballast being secured to a component tray and being directly and snugly engageable with at least one heat sink surface of the housing by a quickly-detachable attachment of the component tray to the first and second side walls.

According to another aspect of the invention, an assembly is disclosed for an electrical fixture housing, the housing of the type enclosing ballasts, the housing including top and rear walls, first and second side walls, and at least one heat sink pad, the assembly including a component tray having a longitudinal axis between first and second ends, a middle portion, and a ballast secured to the middle portion, and, first and second tray attachments structured for quickly-detachable attachment of the respective first and second ends of the component tray to the respective first and second side walls of the housing, where the attachment effects direct and snug engagement of the ballast with the at least one heat sink pad.

According to a further aspect of the invention, apparatus includes a housing for electrical lighting fixtures, the housing of the type enclosing ballasts, the housing including two heat sink pads, a ballast tray having a ballast disposed thereon, hinge means for moving the ballast tray to and from a position of snug engagement with the two heat sink pads, and fastening means for securing the ballast tray to the housing.

According to another aspect of the invention, a method of engaging a ballast of a component tray with at least one heat sink surface of an electrical fixture housing, includes swinging the ballast to a position proximate and essentially parallel to the heat sink surface, and snugging the ballast against the heat sink surface by fastening the component tray to the electrical fixture housing.

As a result of various implementations of the invention, an improved construction of an electrical fixture overcomes certain problems of the prior art by providing optimized heat sinking for ballast transformer(s) of the electrical fixture, while also providing improved serviceability for a ballast circuit of the fixture that includes the ballast transformer.

The foregoing summary does not limit the invention, which is instead defined by the attached claims.

BRIEF DESCRIPTION OF THE DRAWING FIGURES

FIG. 2 is a perspective view of a bare unloaded component tray adapted for having a ballast transformer and associated ballast type components attached thereto and adapted for installation into a lighting fixture of a type having lamp(s), ballast(s), and a housing, according to an exemplary embodiment of the invention.

FIG. 4 is a fragmentary view of a hinge portion of the lighting fixture of FIG. 1.

FIG. 5 is a fragmentary view of an exemplary mounting structure for mounting an attachment rod of the hinge portion to a side wall area of the housing of the lighting fixture of FIG. 1.

DETAILED DESCRIPTION OF THE PREFERRED EMBODIMENTS

Figure 1:
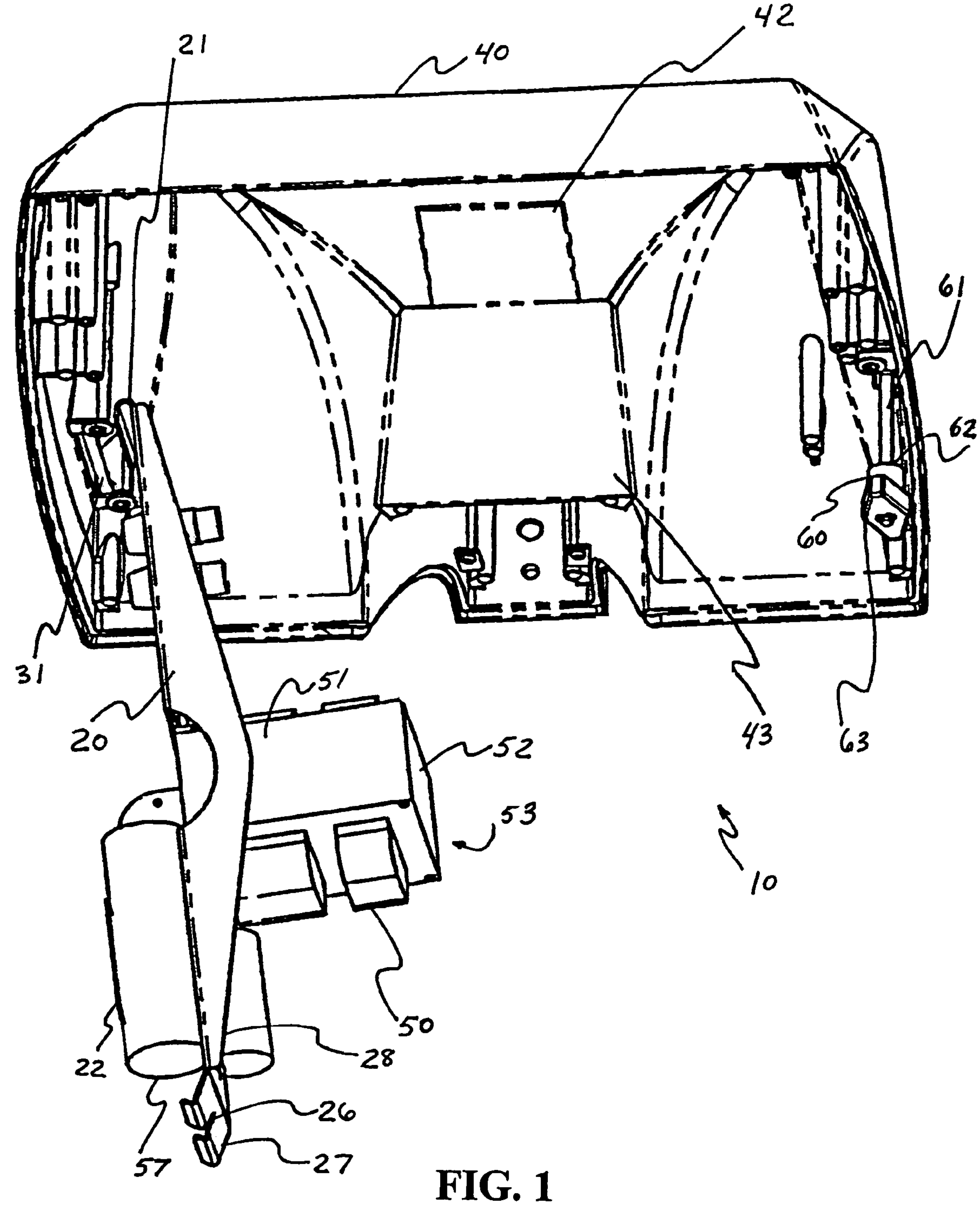
FIG. 1 is a perspective view of a lighting fixture having a component tray adapted for servicing of components disposed thereon, according to an exemplary embodiment of the invention.

FIG. 1 is a perspective view of a lighting fixture 10 of a preferred embodiment. A ballast tray 20 is shown having a hook 21 that is being lifted over and dropped onto a mounting rod 31 that is secured to a portion of the housing 40. Ballast tray 20 is adapted for mounting a ballast transformer 50 thereon. Ballast transformer 50 has opposite long-dimension surfaces 51, 53 and a top surface 52. When hook 21 is placed onto rod 31, ballast tray 20 hangs from rod 31 and may be swung up into housing 40 by pushing up on the distal end 28 of ballast tray 20. When distal end 28 of ballast tray 20 is thus moved into position, a shaft 61 of a fastening portion 60 is placed into a notch 26 of fastening end 28, whereby an angled portion 27 of fastening end 28 is caused to be held up by a fastening surface 62. A knob 63 is threaded onto shaft 61, so that when knob 63 is turned, fastening surface 62 is urged against an outside surface of angled portion 27 and ballast tray 20 is thereby pressed up and into housing 40. In particular, such installation of ballast tray 20 into housing 40 causes top surface 52 of ballast 50 to be pressed against an upper heat sink pad 42, and causes rear-facing long-dimension surface 53 of ballast 50 to be pressed against a rear heat sink pad 43. Preferably, ballast 50 and ballast tray 20 are configured so that surfaces 52, 53 of ballast 50 are respectively parallel with heat sink pads 42, 43 when ballast tray 20 is in the closed and fastened position, thereby optimizing a transfer of heat from ballast 50 to housing 40.

A ballast 50 may have an "open core and coil" construction, in which a core of laminated steel, iron, or similar material has windings of coils of wire. An exemplary ballast transformer suitable for preferred embodiments is an autotransformer ballast available from Advance Transformer Co. of Rosemont, Ill. and has a part number 71A6091A. A dry film capacitor is used in series between the secondary of such a transformer and a lamp (not shown), the capacitor also being available from Advance and having a part number 7C240P40-R. Such a capacitor is shown with a reference character 57 and is secured to ballast tray 20 with a capacitor holder 22.

Typical housings for electrical lighting fixtures are constructed from aluminum, steel, composites or other metals and are commonly designed in view of size concerns as well as a variety of factors including separation of the ballast from other heat-sensitive components, aesthetic appeal, etc. Rear heat sink pad 43 is preferably fully attached to housing 40 around at least three of its four perimeter sides, thereby distributing heat from heat sink pad 43 to adjacent heat conductive portions of housing 40.

Figure 3C:
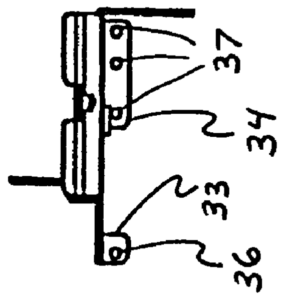
FIGS. 3A–3C are respective top, side, and end views of the component tray of FIG.2.
Figure 3B:
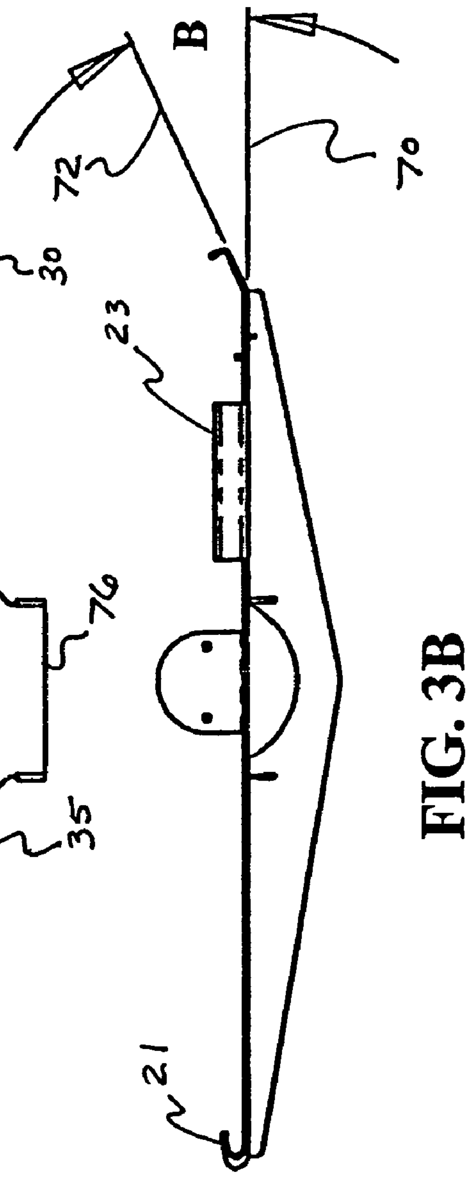
Figure 3A:
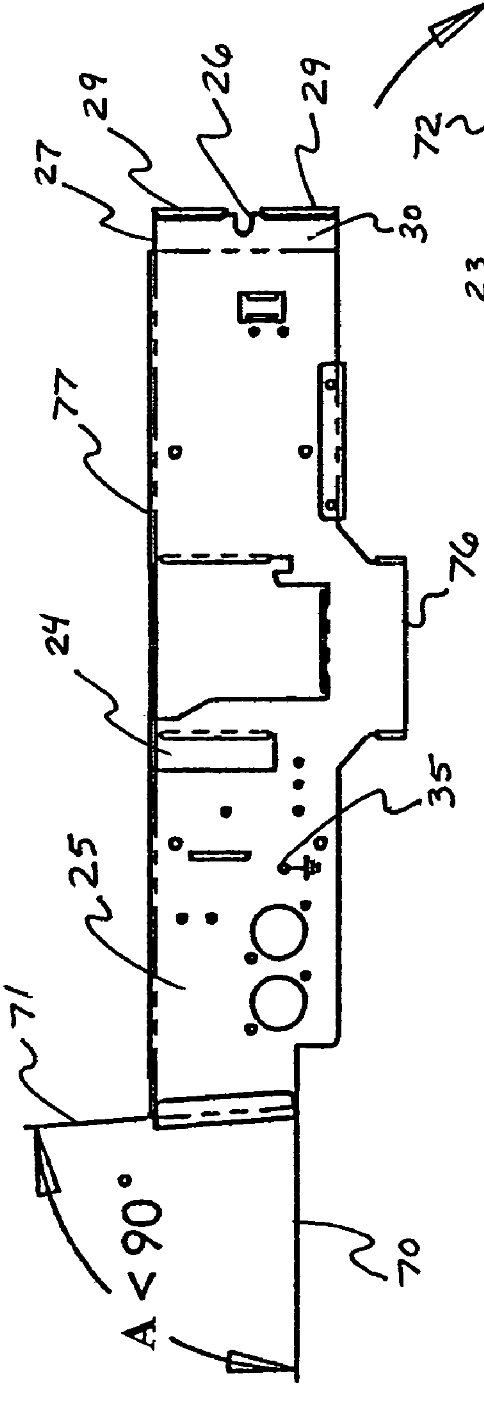

FIG. 2 is a perspective view and FIGS. 3A–C are respective top, side, and end views of a component tray 20 according to an exemplary embodiment. A wire routing hole 24 is provided on a top surface 25 of ballast tray 20 for passing wires (not shown) therethrough, such as for electrically connecting primary windings of ballast transformer 50 with a line voltage and connecting secondary windings of ballast transformer 50 together with leads from capacitor 57 and a lamp socket (not shown), etc. Various other components may be mounted to component tray 20, such as power transistors and other heat-generating components, capacitors and other non-heat-generating components, etc. The components may include a starter/ignitor (not shown) which may include electronic components in a small case, acting, for example, to increase lamp voltage from approximately 280 VAC to approximately 3000 volt pulses, for a short time until a lamp strikes. After the lamp strikes, in this example, the starter deactivates and normal 280 VAC operation resumes. A grounding terminal hole 35 is provided in top surface 25 of ballast tray 20 for attachment of a grounding terminal (not shown) in order to connect earth ground of an electrical service. Opposing rear mounting holes 36 are provided on a rear transformer mounting bracket 33 and front mounting holes 37 are provided on a front transformer mounting bracket 34, for mounting ballast 50 to ballast tray 20 using two long machine screws 32 or the like that pass through corresponding holes 54, 55 formed in ballast transformer 50. A nut plate (not shown) or the like is preferably used for securing ballast transformer 50 to ballast tray 20, whereby threaded holes of the nut plate are engaged by machine screws 32, causing ballast transformer 50 to be tightly secured against the inside surface of brackets 33, 34. Distal ends of screws 32 pass through the opposite holes 36, 37 of the respective hole pairs to provide additional structural integrity.

In the exemplary embodiment of FIG. 3C, three separate pairs of ballast front mounting holes 37 are provided. This allows one of a number of different size ballasts to be selectively installed in component tray 20 for various different applications. For example, the illustrated configuration of tray 20 provides for three different ballast lengths, shown as respective distances between mounting hole 36 and one of the three mounting holes 37. Any width less than or equal to the maximum width distance, between the pair of rear transformer mounting brackets 33 along rear tray wall 76, may be used. Any ballast transformer height less than or equal to the maximum height, for example the distance between ballast tray 20 and rear heat sink pad 43 when tray 20 is in a fastened-down state, may be used.

Figure 13:
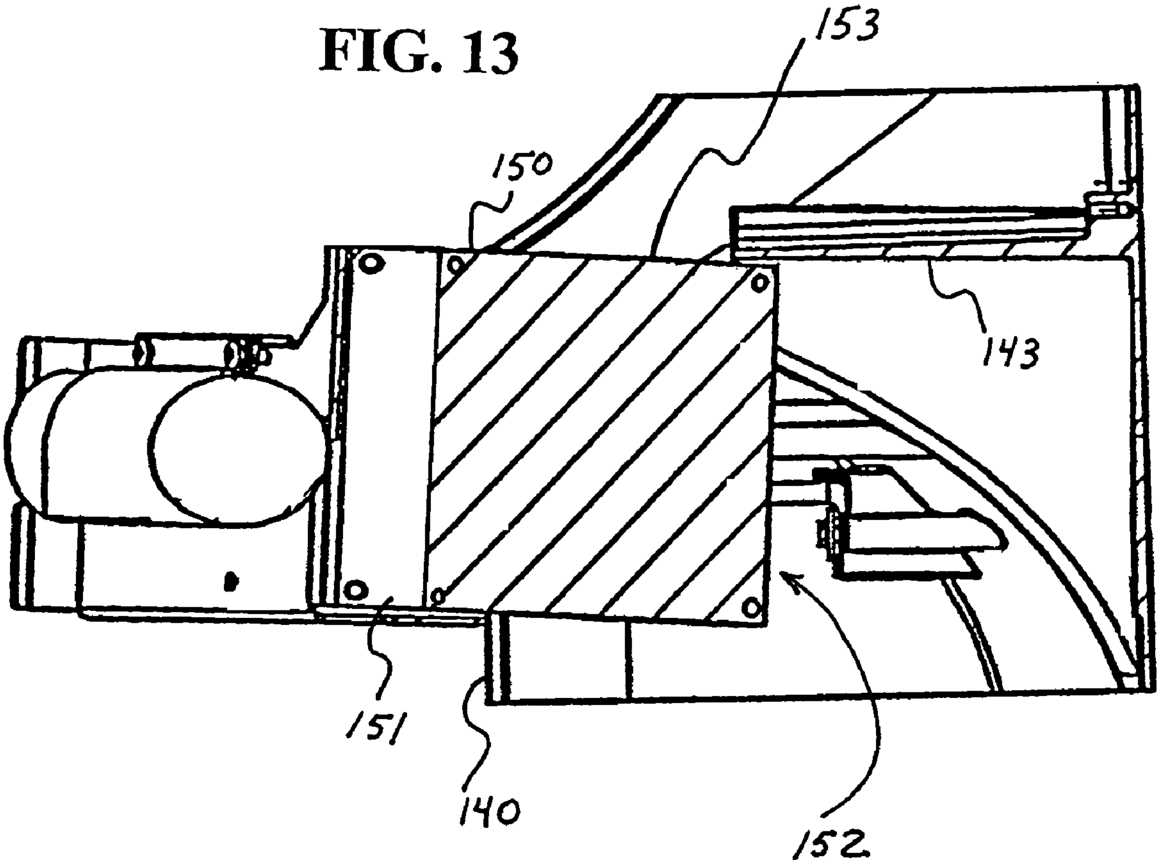
FIG. 13 is a cross-sectional view of a component tray of a lighting fixture having a short ballast installed in the tray and having a height-extending portion attached to an end of the ballast, according to an exemplary embodiment of the invention.

FIG. 13 shows an alternative embodiment where a ballast transformer 150 has a short height. An extension 151, formed of a metal having a high heat conductivity, is attached to a bottom surface of ballast transformer 150, the overall total height of ballast 150 with the added extension 151 is approximately the same as the height of ballast transformer 50. Extension 151 may be a conductive spacer, a set of bracket(s) for attaching ballast 150 at a distance from the inside surface of ballast tray 20, or the like. As a result, when ballast tray 20 is fastened in place, a top surface 152 of ballast 150 engages rear heat sink pad 142 in the same manner as when ballast transformer 50 is used, so that heat of ballast transformer 150 is transferred to heat sink pad 142. It is also possible to use a shorter transformer 150 without using extension 151. In such a case, only a long side 153 of ballast transformer engages a heat sink surface 143 of housing 140, and heat sink pad 142 is not used for heat conduction. A smaller transformer 150 generally produces less heat and the use of only one surface for heat sinking may be acceptable.

Ballast tray 20 is formed with hook 21 being angled away from a rear tray portion 76 to a front tray portion 77. That is, an acute angle A is formed between the longitudinal axis 70 of tray 20 and a longitudinal axis 71 of hook 21. In FIG. 4, a rod 31 having a longitudinal axis 81 is shown mounted near a rear corner of housing 40 using rear rod mounting bracket 47 and front rod mounting bracket 48. An acute angle X is formed between rod longitudinal axis 81 and tray longitudinal axis 70 when component tray 20 is installed. As shown in FIG. 5, rod 31 is mounted onto a rear post 45 and a front post 46 of housing 40. Front post 46 extends to a distance further from a well portion 49 of housing 40, compared with rear post 45. This height difference of posts 45, 46 causes rod 31 to be tilted towards the rear of housing 40 and toward rear heat sink pad 43. In an alternative embodiment, shown by example in FIG. 12, a rod bracket 96 is a cast unitary structure that provides another way of mounting rod 31.

The amount of tilt is shown as an angle Z between a plane 83, normal to rear heat sink pad 43, and rod longitudinal axis 81. Although not mandatory, angle Z is preferably from one to ten degrees. Since the combination of the individual orientations of components of fixture 10 is designed to achieve a positioning of a ballast 50 in a location where a side 53 of ballast 50 is essentially parallel and in close proximity to a heat sink pad 43, angle Z may be selected to be zero or greater than ten degrees, but a corresponding alteration may then be necessary for other dimensions of the fixture. Since angle X causes tray 20 to swing away from heat sink pad 43 when tray 20 is being lowered away from its attached location, angle Z allows the arc of travel of tray 20 to have a two-dimensional nature, whereby tray 20 simultaneously rotates while moving in a downward angle.

Figure 6A:
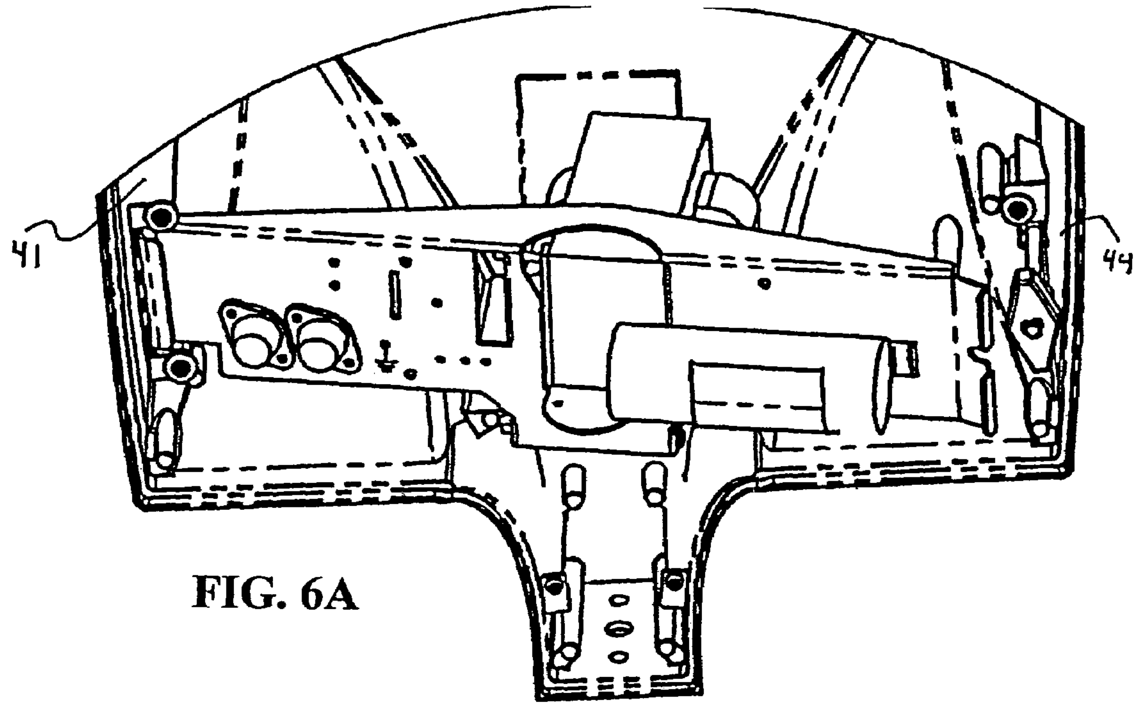
FIGS. 6A–6C are respective perspective views of the lighting fixture of FIG. 1 in successive stages of opening the component tray of the lighting fixture for servicing, according to an exemplary embodiment of the invention.
Figure 6B:
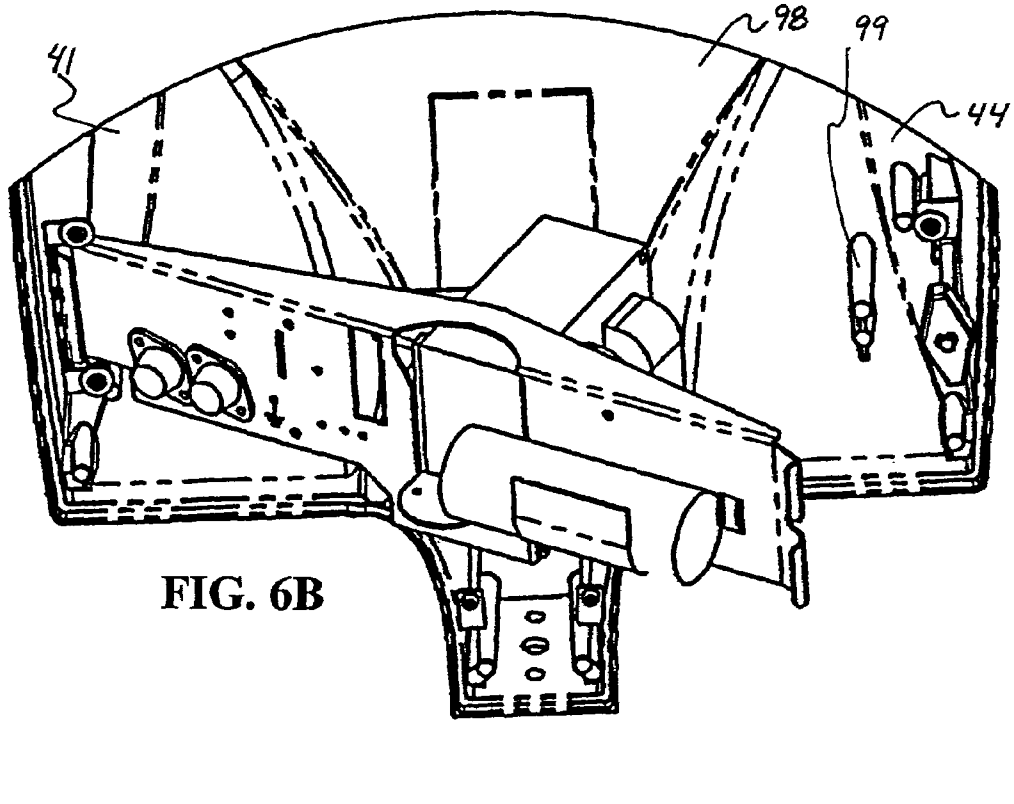
Figure 6C:
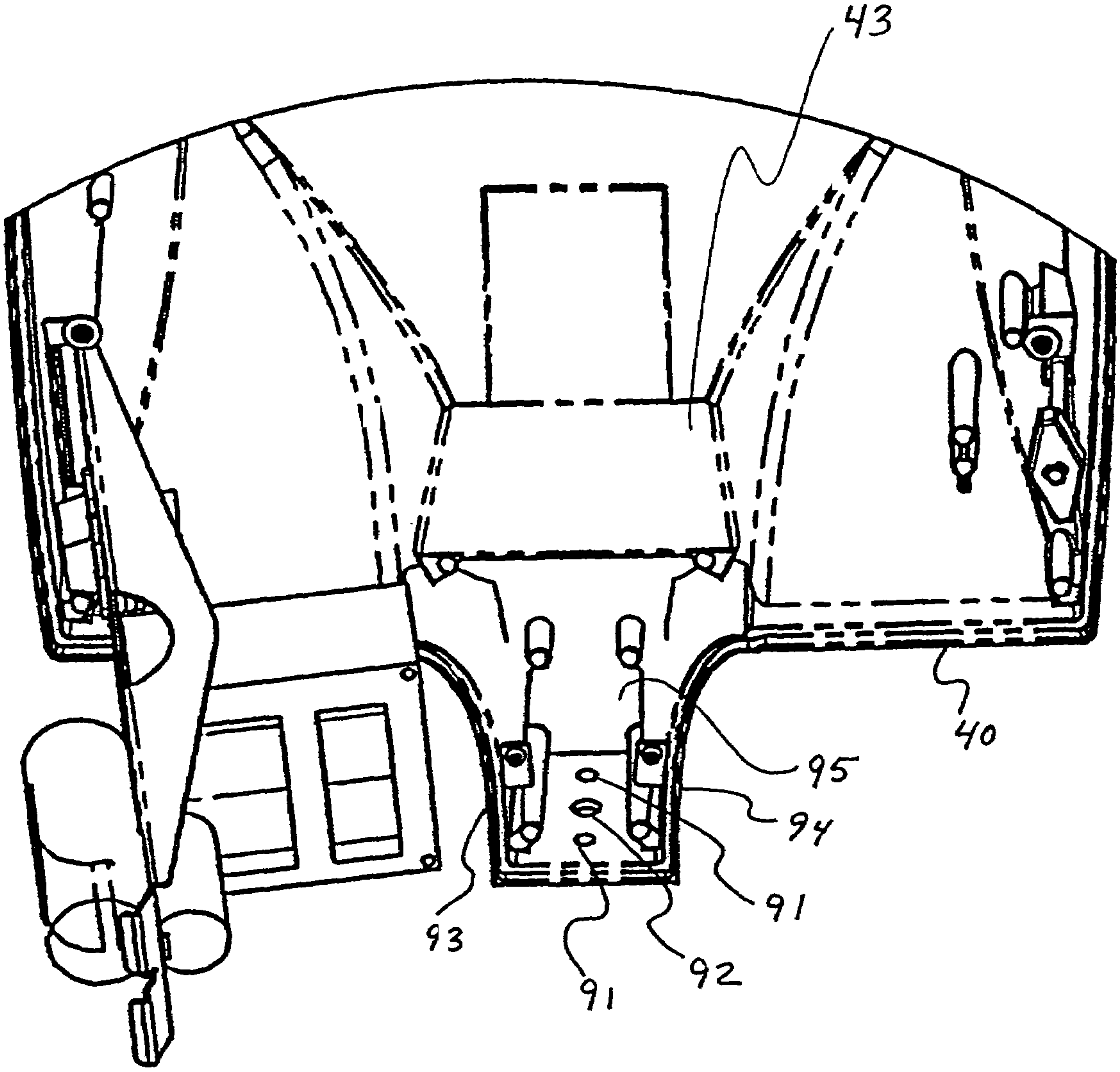
Figure 9:
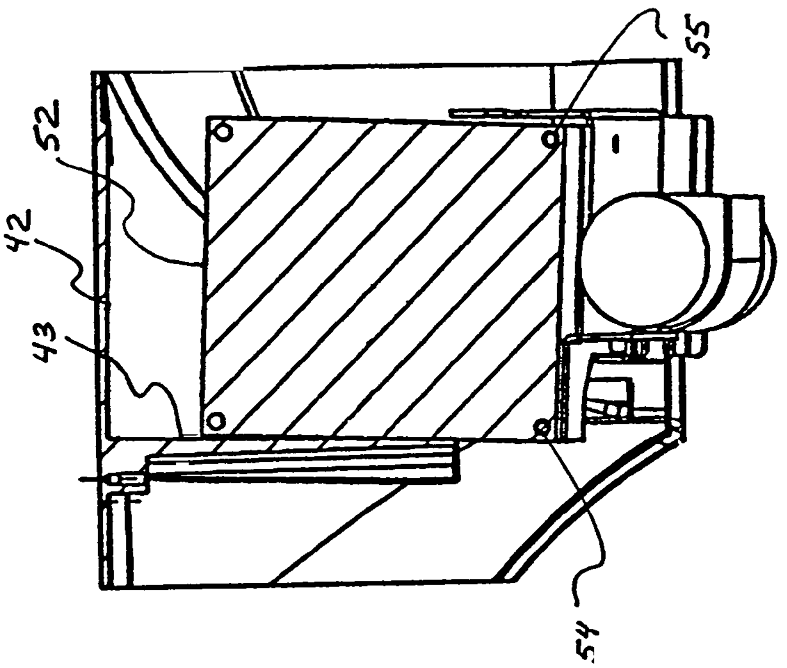
FIG. 9 is a fragmentary cross-sectional view of FIG. 6A, looking toward a fastening end of the lighting fixture of FIG. 1 and showing a relation between heat sink surfaces and the ballast of the component tray of the lighting fixture.
Figure 8:
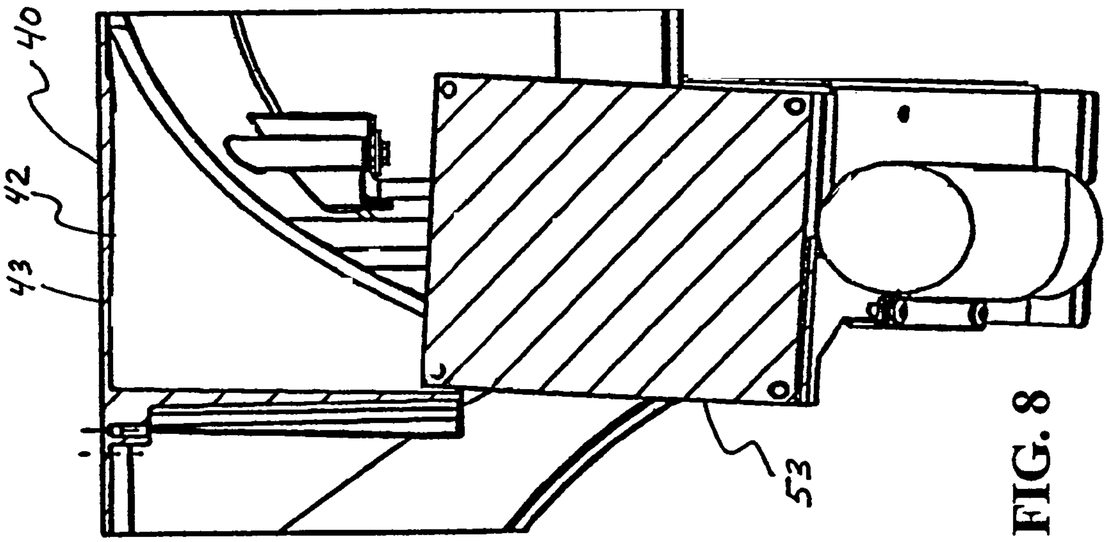
FIG. 8 is a fragmentary cross-sectional view of FIG. 6B, looking toward a fastening end of the lighting fixture of FIG. 1 and showing a relation between heat sink surfaces and the ballast of the component tray of the lighting fixture.
Figure 10:
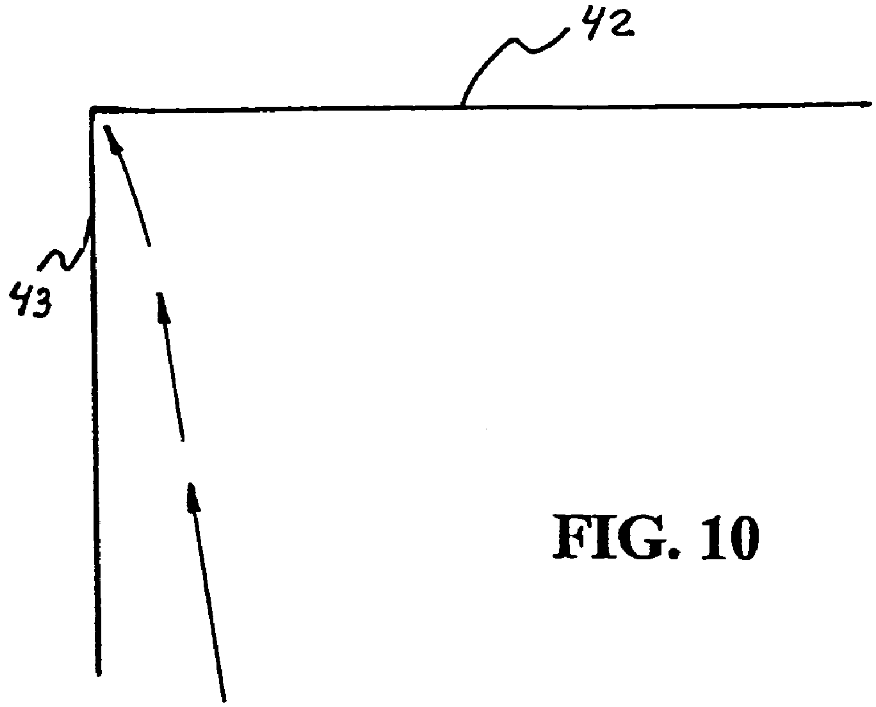
FIG. 10 is a highly schematic view of an arc-shaped line of travel of a ballast transformer being placed into a snug abutment with two orthogonally disposed heat sink surfaces, according to an exemplary embodiment of the invention.

As a result of angles A, X, and Z, tray 20 may be caused to swing away from rear heat sink 43 when ballast tray 20 is being swung down or when ballast tray 20 is being closed into housing 40, as shown in FIGS. 6A–6C. For mounting rod 31, the combination of angles X and Z allows a directionality of ballast tray travel into the heat sink "corner" of the housing formed by the intersection of heat sink pads 42, 43. In particular, FIG. 10 shows an arc of travel for a long side 53 of ballast transformer 50 as it is placed into position by closure of ballast tray 20. This is also shown by FIGS. 8 and 9, respective cross-sectional views of FIGS. 6B and 6A in successive stages of such closure. The arced travel acts to prevent interference of ballast tray 20 and its various components with portions of housing 40. The arced travel is optimized by the specific angles A, X, and Z, so that long side 53 of ballast transformer 50 is positioned to be essentially parallel with heat sink pad 43 at a position where fastener 60 is engaged with fastening end 28 of ballast tray 20.

At the fastening end 28 of ballast tray 20, an angle B is formed between the tray longitudinal axis 70 and a plane 72 of angled portion 27. When fastening shaft 61 is placed into notch 26 of tray 20, fastening surface 62 is caused to rest atop a fastening surface 30 of angled portion 27. Fastening shaft 61 is arranged to be approximately orthogonal to fastening surface 30 when shaft 61 is engaged with notch 26. That is, the attachment and length of shaft 61 causes shaft 61 to be approximately perpendicular to plane 72, in two dimensions. However, shaft 61 is also angled from rear to front of housing 40, which causes ballast tray 20 and long ballast side 53 to be pulled toward rear heat sink pad 43 when knob 63 is tightened down. The tightening of knob 63 also causes ballast tray and long ballast surface 53 to be forced tighter against top heat sink pad 42. Thereby, ballast transformer 50 is tightened in a manner where it is forced into the heat sink corner.

Figure 7:
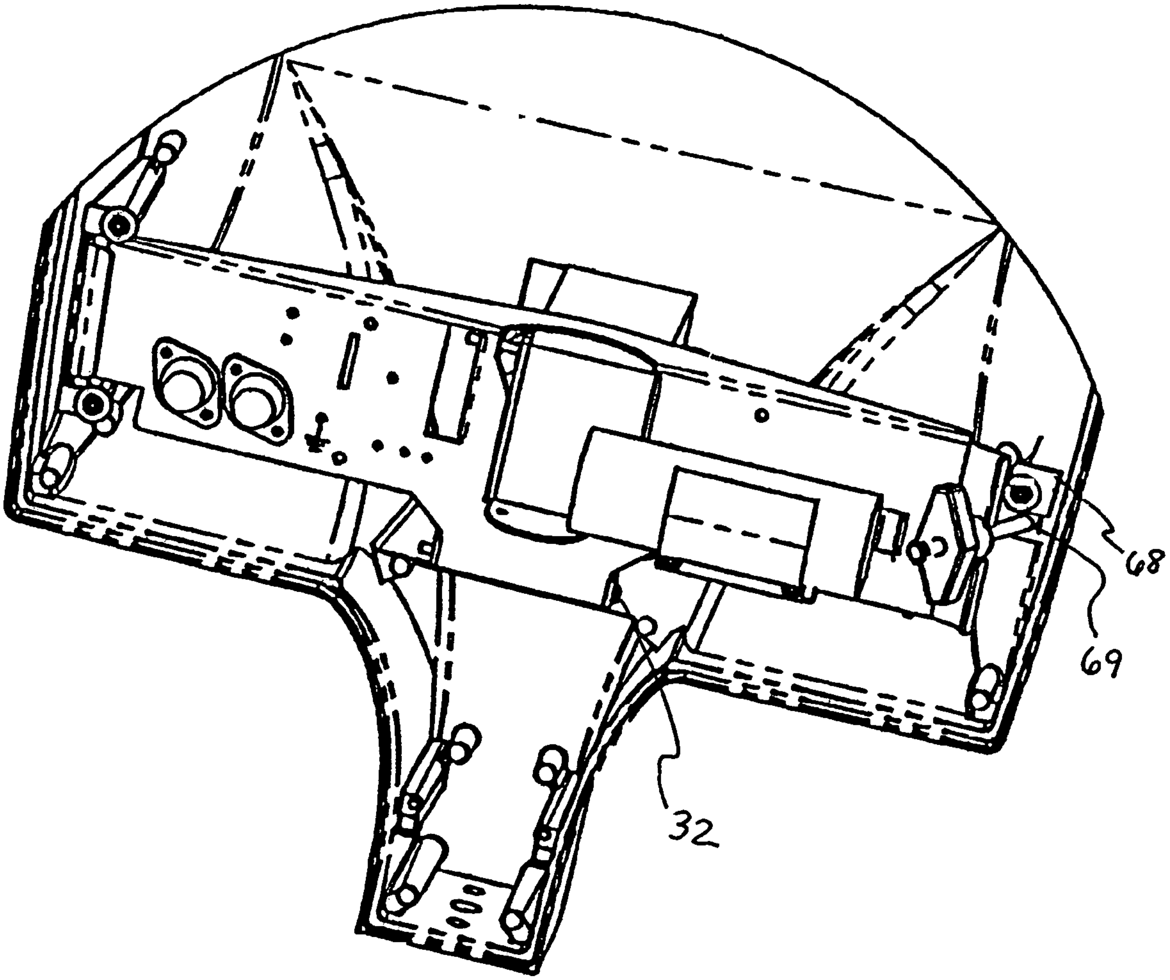
FIG. 7 is a perspective view of the lighting fixture of FIG. 1 showing the component tray of the lighting fixture in a fully closed and fastened position.

The tightening of knob 63 further causes a longitudinal stretching force to be exerted on tray 20 due to the force of fastening surface 62 on fastening surface 30. This longitudinal force acts to slightly bend tray 20 and pull against mounting rod 31, there being at least some elasticity in tray 20 for a slight springing action. A tray stop 99 is formed on an interior surface of housing 40 near fastener 60. Tray stop 99 is dimensioned for abutting a top surface (ballast side surface) of ballast tray 20 near fastening end 28, when ballast tray is in the fastened position of FIG. 7 and knob 63 has been fastened to a predetermined point. At the abutment point, knob 63 is able to be further turned to increase the fastening force of fastening surface on angled portion 27. As knob 63 is further tightened to force ballast tray 20 against tray stop 99, the tightening of knob 63 becomes increasingly more difficult until a point is reached where additional tightening requires great strength and would not be attempted by the service person or installer. At such a point, the deformation or slight stretching of tray 20 caused by the force of fastening surface 62 on angled portion 27, and the orthogonally-oriented force on tray 20 caused by tray 20 being deformed by being over-tightened against the already-snugged ballast 50, are each limited by tray stop 99. Such a state causes ballast tray 20 to be securely fixed at each end and by additional fulcrums established by the aforementioned tray stop 99 and ballast 50 each pushing against middle portions of tray 20. Such use of ballast 50 and tray stop 99 adds additional locations that act as spring members with respect to tray 20 and that contribute to the self-adjustment of tray 20 into its position of alignment of ballast 50 with the heat sink corner of housing 40. This adds to the structural integrity by efficiently distributing the holding forces being exerted on tray 20 and by securing tray 20 at multiple locations. When a short ballast 150 is alternatively used, a ballast extension 151 may be used to provide the ballast fulcrum or, when such extension 151 is not used, tray stop 99 acts to limit the above-described deformation of tray 20 and over-tightening by fastener 60. However, the full benefit of the fastening structure vis-a-vis ballast tray 20, where such ballast acts as a spring member in the self-adjustment of tray 20, is achieved when a ballast of ballast tray 20 is in abutment with top heat sink pad 42. It is noted that during tightening, angle B acts to direct force vectors at rod 31, at heat sink pad 42, and at heat sink pad 43.

Front and rear rod mounting brackets 47, 48 are attached to side wall 41 and fastener 60 is attached to side wall 44. It is understood that the term "side wall" as used herein can refer to portions of housing 40 other than those portions literally on the sides and may refer to portions that are not opposed to one another. For example, posts such as rear and front posts 45, 46 are considered parts of adjacent wall 41, and a given side wall may include curved portions and portions that are angled with respect to top wall 98.

Figure 11:
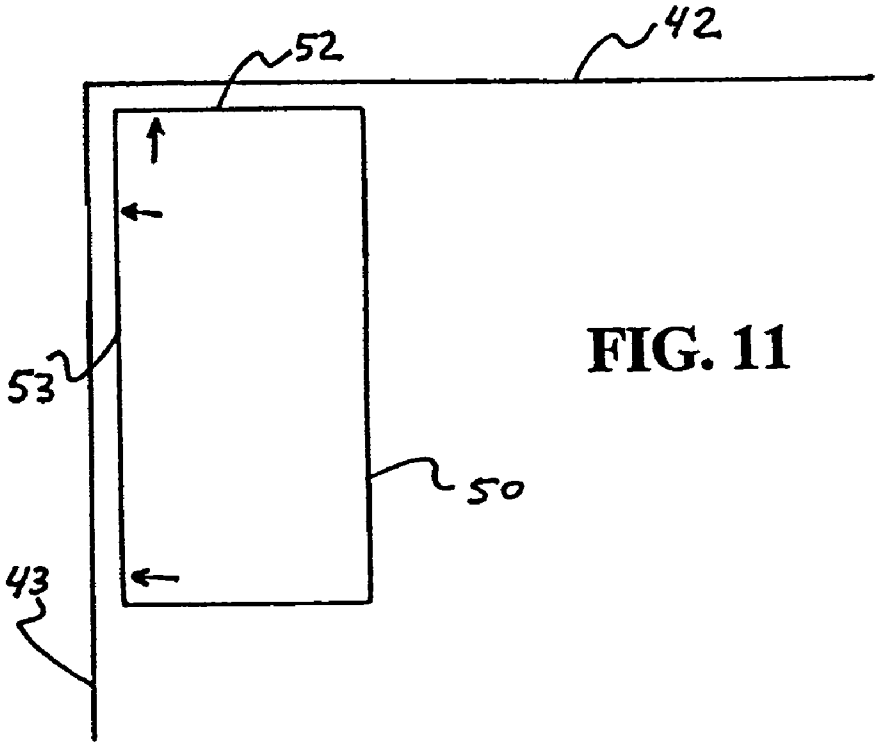
FIG. 11 is a highly schematic view of a tightening of a ballast against two orthogonally disposed heat sink surfaces when a component tray holding the ballast is fastened against a portion of the housing of a lighting fixture, according to an exemplary embodiment of the invention.

FIG. 10 shows generally the arc of travel of long side 53 of ballast 50, also shown by the example of FIGS. 8 and 9. One end result is placement of long side 53 at a position where a subsequent engagement and fastening of fastening end 28 causes long side 53 to be tightened against rear heat sink 43 with essentially the entire surface area of long side 53 being in contact with rear heat sink 43. Another end result is placement of top side 52 of ballast 50 at a position where the subsequent tightening of fastener 60 also causes essentially the entire surface area of top side 52 to contact upper heat sink pad 42. As shown in FIG. 11, the tightening of fastener 60 acts to snug ballast 50 into the heat sink corner by forcing sides 52, 53 against respective heat sink pads 42, 43. In addition, it is noted that the structures of hook 21, fastener 60, and notch 26 each allow for some "slop" due to a loose fit at each of these tray attachment locations, whereby the natural tendency of sides 52, 53 to seat themselves against respective heat sink walls 42, 43 causes each of such attachment structures to adjust slightly during the placement stage of FIG. 10 and the fastening stage of FIG. 11. Accordingly, a highly efficient heat transfer is effected by the snug, tight abutment of sides 52, 53 with respective heat sink pads 42, 43. For example, fastener 60 has a base portion 69 where shaft 61 is loosely attached to housing 40 by a bracket 68. Shaft 61 preferably has an angled portion (not shown) between bracket 68 and housing 40, which keeps shaft 61 from falling out and which becomes pressed against an underside of bracket 68 when shaft 61 is engaged with notch 26 and knob 63 is tightened onto shaft 61. Such a tension type securement of fastener 60 into a tightened position also facilitates the self-adjusting action of the tray attachments due to their loose fit, which increases the ballast placement accuracy and efficiency in snugly seating ballast 50.

When servicing of the lighting fixture 10 becomes necessary, a service person may first turn off the corresponding circuit breaker and remove an outer lens cover (not shown) from the fixture, thereby exposing the inside portion. The service person may then remove any lamp(s) requiring replacement or just leave them in if they are still good and are not likely to be damaged by accessing ballast tray 20. Then, knob 63 may be turned counter-clockwise to loosen fastener 60 and reduce the force being exerted on tray 20 by fastening surface 62. When knob 63 has been adequately backed out, the service person may then carefully lift up slightly on fastening end 28 of tray 20 to relieve the force of gravity being exerted onto fastening surface 62. Such allows fastener 60 to be disengaged from notch 26 and moved near the adjacent side wall of housing 40, out of the way of ballast tray 20, which then can be lowered to hang from rod 31 for servicing as shown in FIG. 6C. A handle (not shown) may be attached to ballast tray 20 for assisting in opening and closing ballast tray 20 and for lifting ballast tray 20 up and over rod 31 when removing or attaching ballast tray 20 to rod 31. It is noted that fixture 10 may be serviced without any tools being required. For example, a cover plate (not shown) is typically used for attaching a glass or similar lens type structure to housing 40 so that light may be transmitted therethrough. Such cover plate may be provided with fasteners that require no tools. Similarly, knob 63 of fastener 60 is preferably easily gripped and rotated by hand, and is formed of a non-conductive material to reduce the possibility of electric shock to the service person. Component tray 20 may be provided with wire connectors, so that component tray 20 may be loosened using knob 63, lowered, disconnected from wires of fixture 10, un-hinged, and then removed from fixture 10, all without the use of any tools. This provides additional safety in an industrial type ballast installation.

The exemplary housing 40 has mounting holes 91 at a rear portion, for optional mounting of light fixture 10 to a post, wall, or other supporting structure. A feed-thru hole 92 is provided for allowing electrical service connections to ballast tray 20 and to one or more lamp sockets. For example, an electrical cord may be secured at feed-thru 92 using a strain relief, grommet, or the like, or a conduit fitting or other suitable structure may be attached for safely providing electrical service. A connection compartment 95 is provided between the curved rear walls 93, 94 of housing 40 and the rear side of rear heat sink pad 43. Such connection compartment 95 provides a convenient space for connecting, for example, individual jumper assemblies (not shown) using twist-on wire connectors and the like, and for installation of an earth ground connection to housing 40, and for other electrical connections.

Figure 12:
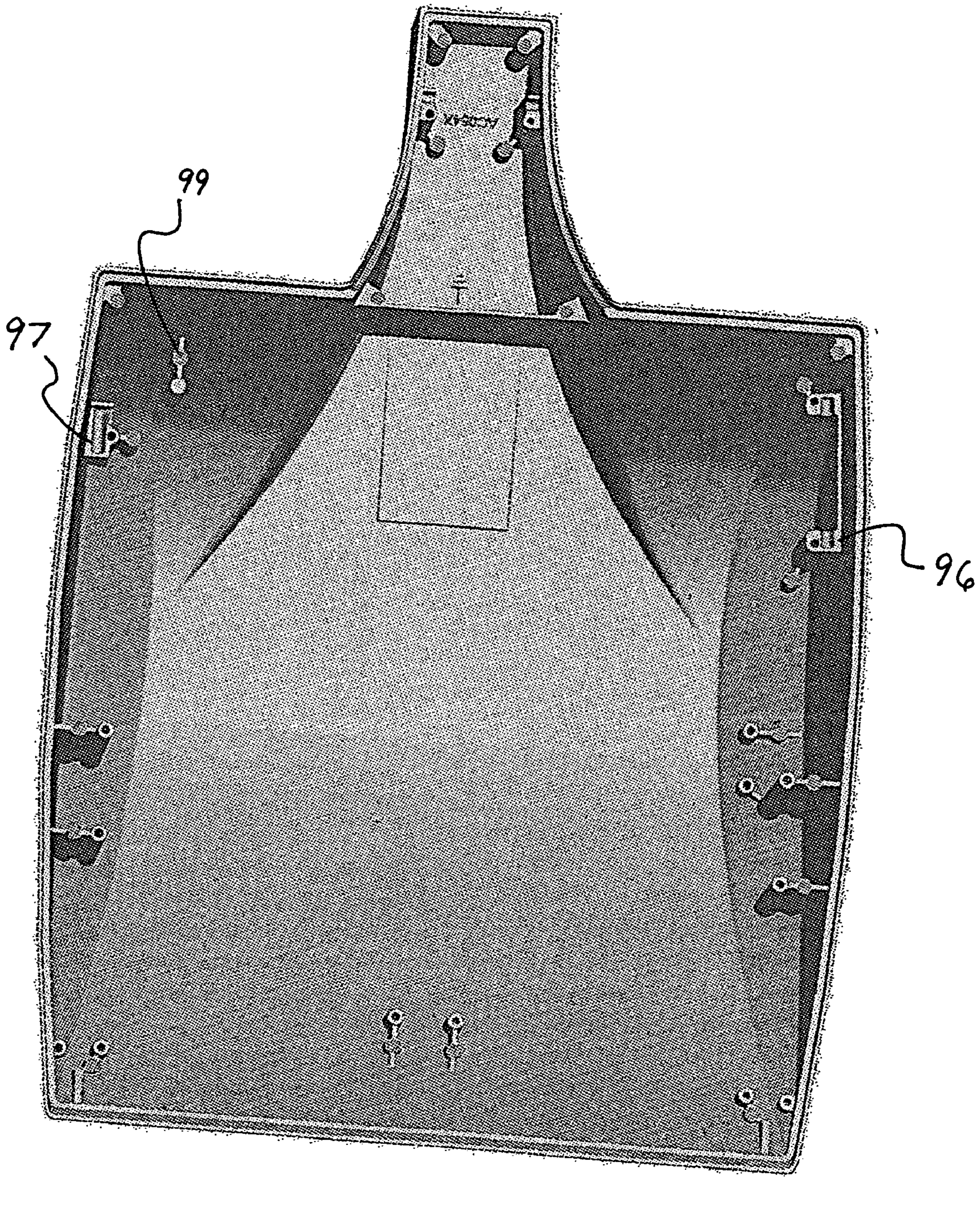
FIG. 12 is a perspective view of a housing for a lighting fixture according to an exemplary embodiment of the invention.

FIG. 12 shows a housing 40 formed by casting or similar process, although other processes such as welding may be used. A rod mounting bracket base 96 is formed as a portion of a cast housing 40, bracket base 96 having grooves for receiving rod 31 and having tapped holes for receiving mounting hardware for holding rod 31 in its intended location. In a preferred embodiment, bracket brace 96 has an upper portion having a same height at each end thereof, where one or more rod holders may be attached such as by being secured to threaded receptacles in bracket 96. Such a bracket 96 has a rod-holding portion with an angle Z formed therein for holding rod 31 at the required angle with respect to heat sink pad 43. A fastener bracket base 97 has a groove for receiving a hooked bottom portion of fastener 60 and has a tapped hole for receiving mounting hardware for attaching fastener 60 so that it does not fall out of housing 40.

Heat sink pads 42, 43 are preferably arranged perpendicularly with respect to one another. As shown in FIGS. 8 and 9, top heat sink pad 42 is a separate surface from well portion 49 of housing 40 because the well portion 49 curves away from the flat surface of top heat sink pad 42. Rear heat sink pad 43, as shown in FIG. 1, is formed as a separate surface that is, for example, joined to housing 40 by welding or other structure. Housing 40 is a heat sink and heat from ballast 50 is transferred to the two respective engaged walls of integral heat sink pads 42, 43.

The heat generated in a lighting fixture typically causes components to have a shortened life. A general rule of thumb is that, for every ten degrees Celsius you remove from the lighting fixture, you double the life of individual components. The mounting of a ballast within the enclosure of a lighting fixture housing, for dissipating the generated heat by conduction and radiation, is therefore important to its operation. As a result of implementing the double heat-sinking structure of fixture 10, as much as ten to fifteen degrees Celsius may be removed. Otherwise, ballast heat would be trapped and damage would result.

In conventional structures, heat transfer, from the ballast to the fixture housing which encloses the ballast, lamp and other electrical lighting fixtures, is facilitated by the application of grease, gel, resin and the like to a single surface of the ballast case connected with respect to the housing. Mounting plates have also been used to provide a medium for heat transfer from one surface of the ballast to one surface of the housing. While heat transfer is a major concern in housing design, the housing must also provide free access to ballast components and wiring so that maintenance can be performed. Such an advantage is provided by implementation of the present invention. In addition, the present invention may be applied to situations where a large heat dissipation is not required, but where serviceability and at least some heat reduction is desired, such as for heat sinking protection of heat-sensitive components of a component tray. For example, when a scale is small, a space savings may result from being able to package components in a smaller footprint because heat is conducted to an adjacent housing rather than being accumulated at the heat generation location.

Although the illustrated exemplary embodiments each include a ballast tray 20 being disposed in the same housing as a lamp, it is also possible to enclose lamps and ballasts in separate housings. In such a case, it is desirable to install a lighting fixture in close proximity to a ballast housing, so that high voltage wiring between the two structures is minimized. Such a ballast housing (not shown) is preferably provided with a pair of heat sink pads disposed orthogonally with respect to one another, so that a ballast of the housing may be snugly engaged with the corresponding heat sink corner by attachment of ballast tray 20, as for the embodiment of FIG. 1 and others described herein. The same serviceability is thereby provided while optimizing heat sinking of the ballast. Similarly, the invention may be implemented in electrical fixtures used in applications other than lighting. For example, a component tray may be attached with a quickly-detachable mechanism for use in any application where a transformer of the component tray becomes hot and it is desired to transfer the heat by conduction to the walls of a housing or other heat sinking structure.

While the principles of the invention have been shown and described in connection with specific embodiments, it is to be understood that such embodiments are by way of example and are not limiting. Consequently, variations and modifications commensurate with the above teachings, and with the skill and knowledge of the relevant art, are within the scope of the present invention. The embodiments described herein are intended to illustrate best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. In a housing for electrical lighting fixtures, the housing of the type enclosing ballasts, the housing including top and rear walls, first and second side walls, and a heat sink surface, a ballast is secured to a component tray and is directly and snugly engageable with the heat sink surface of the housing by a quickly-detachable attachment of the component tray to the first and second side walls.

2. The housing of claim 1 further comprising a mounting apparatus for the quickly-detachable attachment of the component tray to the first and second side walls, the mounting apparatus having a hinge portion structured for movement of the component tray to a first position where a side face of the ballast is in close proximity to the heat sink surface, and having a fastening portion structured for movement of the component tray from the first position to a second position where the side face of the ballast is in snug engagement with the heat sink surface.

3. The housing of claim 2 wherein the hinge portion has a hinge axis that is not orthogonal to any other component of the housing.

4. The housing of claim 3 wherein the hinge includes a rod secured to the first side wall, the rod being non-parallel and non-orthogonal with respect to any other component of the housing.

5. The housing of claim 2 wherein the housing is a heat sink and heat from the ballast is transferred to at least two heat sink surfaces of the housing.

6. The housing of claim 5 wherein respective planes of the two heat sink surfaces intersect at a heat sink corner, and wherein the mounting apparatus is structured so that, for attachment of the component tray to the housing, the ballast is caused to converge with the heat sink corner and, for a detachment of the component tray, the ballast is caused to diverge from the heat sink corner.

7. The housing of claim 5 wherein the two heat sink surfaces are orthogonal with respect to one another and form a heat sink corner at an intersection of the two heat sink surfaces.

8. The housing of claim 2 wherein the mounting apparatus includes a latch attached to the second side wall and adapted for detachable engagement with the component tray.

9. The housing of claim 8 wherein, for the attachment of the component tray, the latch cooperates with the component tray to secure the component tray to the second side wall, to urge the component tray toward the second side wall, to urge the component tray toward the rear of the housing, and to urge the component tray toward the top wall of the housing.

10. The housing of claim 9 wherein the component tray has a receptacle at a distal end thereof, and wherein the latch has a shaft secured to the second side wall at a position where insertion of the shaft in the receptacle causes the shaft to extend outwardly with respect to the rear wall of the housing.

11. The housing of claim 1 wherein attachment of the component tray to the sidewalls is angled in at least two dimensions with respect to the heat sink surface so that excursion of the ballast, to a position of snug engagement between the ballast and the heat sink surface, has an arc-shaped line of travel.

12. The housing of claim 1 further comprising a tightening fastener structured for urging the ballast into snug engagement with the at least one heat sink surface, when the tightening fastener is tightened against the component tray.

13. An assembly for an electrical fixture housing, the housing of the type enclosing ballasts, the housing including top and rear walls, first and second side walls, and at least one heat sink pad, the assembly comprising:

a component tray having a longitudinal axis between first and second ends, a middle portion, and a ballast secured to the middle portion; and first and second tray attachments structured for quickly-detachable attachment of the respective first and second ends of the component tray to the respective first and second side walls of the housing, wherein the attachment effects direct and snug engagement of the ballast with the at least one heat sink pad.

14. The assembly of claim 13 wherein the at least one heat sink pad comprises two heat sink pads orthogonally disposed respecting one another, and wherein the attachment effects direct and snug engagement of the ballast with the two heat sink pads.

15. The assembly of claim 13 wherein the first tray attachment comprises a hook disposed laterally along the first end of the component tray, the hook being non-orthogonal with respect to the longitudinal axis of the component tray.

16. The assembly of claim 15 wherein the first tray attachment further comprises a rod secured to the first sidewall of the housing for quickly-detachable attachment of the hook thereto, the secured rod having its longitudinal axis tilted in a direction slightly toward the heat sink pad.

17. The assembly of claim 15 wherein the secured rod is oriented in a direction that generally converges with an adjacent side wall as the secured rod extends away from the rear wall.

18. The assembly of claim 13 wherein the second tray attachment is structured for tighteningly attaching the second end of the component tray to the second side wall.

19. The assembly of claim 15 wherein the second end of the component tray is beveled, whereby a tightening of the fastener onto the beveled second end forces the component tray into the housing toward the rear wall and forces the component tray toward the second side wall.

20. The component tray assembly of claim 13 wherein, during detachment or attachment of the second end of the component tray to the second side wall of the housing, the structural relation between the first and second tray attachments and the walls of the housing causes an arc-shaped excursion of the component tray from/to a position of snug engagement between the ballast and the rear wall of the housing.

21. Apparatus comprising:

a housing for electrical lighting fixtures, the housing of the type enclosing ballasts, the housing including two heat sink pads;

a ballast tray having a ballast disposed thereon;

hinge means for moving the ballast tray to and from a position of snug engagement with the two heat sink pads; and fastening means for securing the ballast tray to the housing.

22. Apparatus of claim 21 wherein the moving of the ballast tray constitutes an excursion with an arc-shaped line of travel.

23. Apparatus of claim 21 wherein the hinge means is loosely fitted with the housing, whereby the securing effects a self-adjusting of the snug engagement of the ballast with the heat sink pads.

24. A method of engaging a ballast of a component tray with at least one heat sink surface of an electrical fixture housing, comprising:

swinging the ballast to a position proximate and essentially parallel to the heat sink surface; and snugging the ballast against the heat sink surface by fastening the component tray to the electrical fixture housing.

25. The method of claim 24 wherein the component tray is attached to the electrical fixture housing at two attachment locations, and wherein the snugging comprises self-adjusting of the component tray at the two attachment locations, whereby the ballast is seated against the heat sink surface.

* * * * *